(12) United States Patent
Hayward et al.

(10) Patent No.: US 8,217,827 B2
(45) Date of Patent: Jul. 10, 2012

(54) RADAR METHOD AND APPARATUS SUITABLE FOR USE IN MULTIPATH ENVIRONMENTS

(75) Inventors: Stephen David Hayward, Malvern (GB); Richard Oliver Lane, Malvern (GB)

(73) Assignee: Qinetiq Limited, London (GB)

( * ) Notice: Subject to any disclaimer, the term of this patent is extended or adjusted under 35 U.S.C. 154(b) by 355 days.

(21) Appl. No.: 12/678,895

(22) PCT Filed: Oct. 13, 2008

(86) PCT No.: PCT/GB2008/003476
§ 371 (c)(1),
(2), (4) Date: Mar. 18, 2010

(87) PCT Pub. No.: WO2009/047546
PCT Pub. Date: Apr. 16, 2009

(65) Prior Publication Data
US 2010/0207804 A1    Aug. 19, 2010

(30) Foreign Application Priority Data
Oct. 12, 2007   (GB) .................................. 0719995.3

(51) Int. Cl.
*G01S 13/00*   (2006.01)
(52) U.S. Cl. ........................... 342/28; 342/147; 342/104
(58) Field of Classification Search ............ 342/104–158
See application file for complete search history.

(56) References Cited

U.S. PATENT DOCUMENTS

| | | | |
|---|---|---|---|
| 4,595,924 A | 6/1986 | Gehman | |
| 6,724,340 B1 | 4/2004 | Carlos et al. | |
| 2005/0083199 A1* | 4/2005 | Hall et al. | 340/552 |
| 2006/0238407 A1* | 10/2006 | Bourdelais et al. | 342/90 |

FOREIGN PATENT DOCUMENTS

| | | |
|---|---|---|
| GB | 2 378 335 A | 2/2003 |
| WO | WO 2006/059926 A1 | 6/2006 |

(Continued)

OTHER PUBLICATIONS

Fishler et al., "MIMO Radar: An Idea Whose Time Has Come," Radar Conference 2004, Proceedings of the IEEE, Apr. 26, 2004, pp. 71-78.

(Continued)

*Primary Examiner* — Timothy A Brainard
(74) *Attorney, Agent, or Firm* — Oliff & Berridge, PLC

(57) ABSTRACT

A method and system for locating objects in a region having a high degree of multipath susceptibility comprises a plurality of transducers, each being a transmit or receive antenna, and being arranged about the region in known locations, to form a bistatic or multistatic radar, with some embodiments being MIMO systems. Signals transmitted by the transmit antenna(s) are received at each receive antenna and processed to form a set of channel impulse responses, or power delay profiles, representative of the region at a given time. A second set is formed at a different time, and the difference between the two sets is calculated, the difference containing information on movement within the region. The difference may be processed to localize the moving object(s) by graphical means, e.g. by generating an x-y image representative of the region, and accumulating at each pixel appropriate values of the profile difference selected according to the propagation delay between a transmit-receive antenna pair via a region point represented by the pixel.

20 Claims, 10 Drawing Sheets

FOREIGN PATENT DOCUMENTS

| | | |
|---|---|---|
| WO | WO 2006/110260 A1 | 10/2006 |
| WO | WO 2007/058302 A1 | 5/2007 |

OTHER PUBLICATIONS

Shrader et al., "MTI Radar: Introduction to MTI Radar," Radar Handbook—Second Edition, 1990, Chapter 15.1.

Skolnik, "MTI and Pulse Doppler Radar," Introduction to Radar Systems, 1981, pp. 101-106.

Lane et al., "Detecting Personnel in Wooded Areas Using MIMO Radar," Radar 2007, The Institution of Engineering and Technology International Conference on Radar System, Oct. 16, 2007.

Donnet et al., "MIMO Radar, Techniques and Opportunities," Proceedings of the $3^{rd}$ European Radar Conference, Sep. 2006, pp. 112-115.

Bekkerman et al., "Target Detection and Localization Using MIMO Radars and Sonars," IEEE Transactions of Signal Processing, vol. 54, No. 10, Oct. 2006, pp. 3873-3883.

Dinan et al., "Spreading Codes for Direct Sequence CDMA and Wideband CDMA Cellular Networks," IEEE Communications Magazine, Sep. 1998, pp. 48-54.

Mather, "The Incremental Multi-Parameter Algorithim," $24^{th}$ Asilomar Conference on Signals, Systems and Computers, Nov. 1990, pp. 368-372.

Li et al., "Efficient Mixed-Spectrum Estimation with Application to Target Feature Extraction," IEEE Transactions on Signal Processing, vol. 44, No. 2, Feb. 1996, pp. 281-295.

Search Report issued in British Application No. 0818682.7, conducted Feb. 13, 2009.

Search Report issued in corresponding British Application No. 0719995.3, conducted Feb. 12, 2008.

International Search Report issued in corresponding International Application No. PCT/GB2008/003476, mailed Jan. 29, 2009.

Written Opinion of the International Searching Authority issued in corresponding International Application No. PCT/GB2008/003476, mailed Jan. 29, 2009.

* cited by examiner

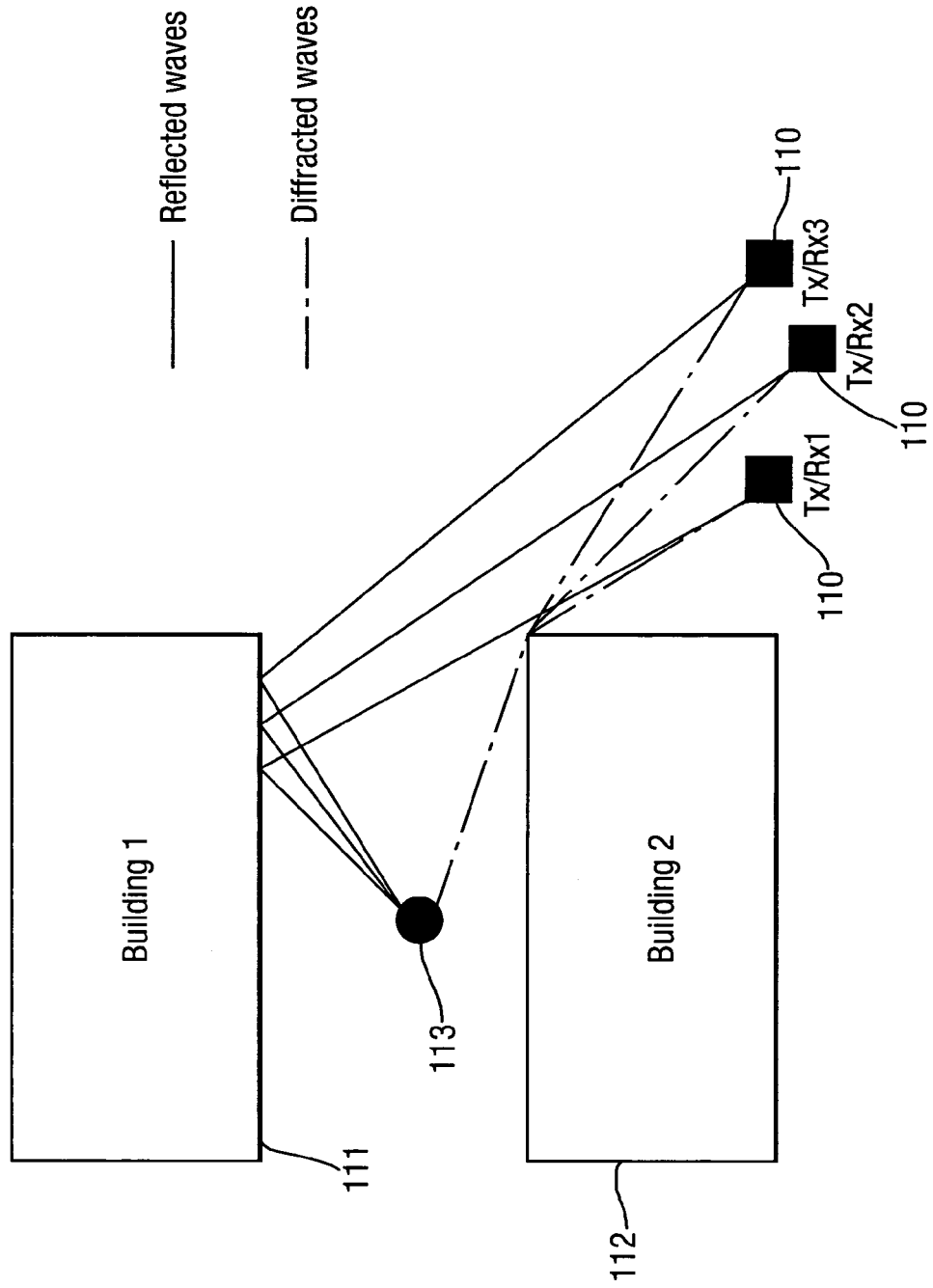

RADAR METHOD AND APPARATUS SUITABLE FOR USE IN MULTIPATH ENVIRONMENTS

This invention relates to radar and similar systems. In particular, it relates to radar systems and the like adapted or otherwise suitable for use in environments typically prone to strong multipath signal propagation, such as wooded or urbanised areas.

There is a current desire for systems capable of detecting objects, including personnel and vehicles, in wooded areas. Electro-Optical systems, including thermal imagers, may be used with some success in this environment, but are not effective through anything but relatively thin cover. Tree canopies are effective at obscuring electromagnetic (EM) radiation at visible and infra-red frequencies and also provide significant attenuation to radiation above low GHz frequencies.

Traditional radar systems may be used at lower frequencies, where the EM radiation is able to penetrate the foliage to a greater degree. Such systems have been deployed on airborne platforms, normally operative at frequencies of around 1-2 GHz. These systems are faced with a problem of large clutter returns from the trees, and significant multipath problems caused by the scattering and embrangling of EM radiation from tree trunks and canopies. Lower frequencies would provide improved penetration of the environment, but require larger antennas to achieve the same directional accuracy and still suffer from the scattering problems.

In urban areas, buildings can obscure targets. Additionally there is significant multipath from buildings and other objects, such as lamp posts, signs and vehicles. As such, the urban environment has multipath problems similar to wooded areas.

Traditional radar systems have employed "Moving Target Indicator" (MTI) systems to remove (stationary) clutter from the scene. These involve storing a return from a pulse, and subtracting from this return the return from the next pulse. Thus that part of the return coming from a moving object will be emphasised as it will be different in the previous pulse. This is described for example in "The Radar Handbook", Skolnik, 1990, Chapter 15.1. MTI algorithms have difficulty detecting slowly moving targets that do not move much during a single pulse repetition interval. They are also adversely affected by multipath effects when using a single antenna.

The use of multiple transmitter antennas and/or receiver antennas is commonplace in radar systems, both in monostatic and bistatic systems, with phased array systems being the most commonplace. Recently however multiple antenna systems have been developed that use so-called Multiple input, Multiple output (MIMO) techniques, that exploit the spatial diversity created by having independent propagation channels between each transmit antenna and each receive antenna, thus allowing independent measurements to be taken for each transmit antenna-receive antenna pair.

Examples of such systems are described in Donnet, B J, Longstaff, I D, "*MIMO Radar Techniques and Opportunities*", Proc. 3$^{rd}$ European Radar Conference, Manchester, UK, September 2006, and Bekkerman I, Tabrikian J, *Target Detection and Localization Using MIMO Radars and Sonars*", IEEE Trans. Sig. Proc. Vol. 54 No 10, October 2006, pp 3873-3883.

According to a first aspect of the present invention there is provided a method of detecting a moving object or objects in a region of interest, the region including a multipath rich environment, comprising the steps of:

i. arranging at least three transducers about the region in known locations, each transducer being a transmit antenna or a receive antenna, and there being at least one transmit antenna and at least one receive antenna;

ii. for a given transmit and receive antenna pair, transmitting a first signal from the at least one transmit antenna, and receiving it at the at least one receive antenna, the signal at the receive antenna being a composite signal made up of signals received from multiple propagation paths;

iii. processing the first composite signal to produce a first power delay profile response (alternatively known as an impulse response) representative of the transit time or times of the transmitted signal at the receive antenna;

iv. repeating steps ii and iii as necessary for each other transmit antenna and receive antenna pair to produce, for N transmit and M receive antennas, a first set of N×M responses each comprising a power delay profile response, and being representative of the region at a first time;

v. repeating steps ii. to iv. to produce a second N×M set of power delay profile responses representative of the transit time or times of arrival of the transmitted signal(s) at the receive antenna(s) and being representative of the region at a second time;

vi. calculating a difference between the first and second set of responses, the difference containing values representative of signal strength received for different signal propagation times, and including information relating to object movement between the first and second time;

vii. using the transmitter and receiver antenna location information, and the timing information in the power delay profile difference to localise the moving object.

The present invention is particularly suitable for use in environments where signals are subject to a high degree of multipath. The additional paths taken by the propagating signals as they scatter from objects in the region of interest provide information as to the locations of the scatterers. The invention makes use of this information by looking for differences between the composite signals received from transmissions at different times. If nothing has changed, then there will be little difference between the composite signals, indicative of no significant movement within the region. If there is a change, then the composite signals will be different, and this difference will be dependent upon the degree of change that has occurred.

The composite signal response may be processed using known filtering techniques, such as using a matched filter, to provide an impulse response. Details of such processing techniques are known, and are described in, for example, M Skolnik, "Introduction to Radar Systems". The impulse response may comprise a set of complex values each having an associated propagation delay time, each complex value representing the phase and signal strength of the signal following the propagation path having the associated propagation delay time.

The use of a single transmitter and single receiver antenna will provide some localisation ability within the region of interest. In this case however the localisation will be limited to inferring the location of the moving object on the perimeter of an ellipse having the antennas positions as its foci, with the timing information in the power delay profile difference used to generate a constant distance between the foci via any point on the perimeter. By using more than one transmit or receive antenna as in the current invention, to create a plurality of transmitter-receiver pairs, the localisation may be much more precise, with the precision dependent upon factors such as the degree of movement of the target, the layout of the transmitters and receivers about the region, and the signal to noise levels present at the receivers.

Ideally each transducer is located spatially separately from each other transducer. The constraints of a given situation may mean that some transducers have to be located together, for example if there is no convenient separate location for each transducer. The invention still has utility however when one transducer is located separately from the others, albeit the localisation effectiveness will be reduced.

A plurality of transmitter antennas may be used, with each antenna advantageously being located spatially separately from the others. Advantageously the degree of separation is chosen such that signals emanating from each antenna provide spatially independent signals, leading to a unique set of propagation paths within the region. This will typically be at least half a wavelength of the transmitted signal at its centre frequency, and preferably be at least a wavelength separation between receivers, although in general a wider spacing such as two, four, eight, or fifteen wavelengths will generally give better performance from the point of view of providing spatially independent signals, and localisation of the moving object, should space allow.

Using multiple transmit and/or receive antennas in this manner improves the localisation performance, as will become clear from the description herein.

Each transmit antenna may be associated with its own transmitter, or a plurality of antennas may be multiplexed from each transmitter. In this latter case the signals transmitted may be time-multiplexed so that only a single antenna connected to each transmitter is active at any one instant.

A plurality of receiver antennas may be used, with each antenna advantageously being located spatially separately from the others.

Advantageously the degree of separation is chosen such that each receiver antenna receives a spatially independent signal. The guidelines on spacing the receive antennas follow the same principles as described above in relation to the transmit antennas. In this manner it is made more likely that the propagation paths between the network of transmitters and receivers will have independent fading characteristics. This provides the advantages of a Multiple Input, Multiple Output (MIMO) system, wherein the multiple independent propagation paths provide additional information to the system, specifically the location of potential targets. Preferably each receive antenna is associated with its own receiver. This allows for simultaneous processing of the received signals. Alternatively a plurality of antennas may be multiplexed from each receiver. This may lead to a lower cost option, but has an impact on the system pulse repetition frequency (PRF).

Antennas associated with each transmitter and receiver may be freely positionable within a region of interest, or may alternatively be fixed in position with respect to each other by, for example, being mounted on a suitably sized boom.

To enable localisation of the moving object the locations of each of the transmitter and receiver antennas are stored. The location of the antennas with respect to each other may be determined by any suitable means, such as a GPS system, a map reference, measuring wheel, laser rangefinder, or any other suitable means. Should the system be adapted to process received signals to calculate a location of moving objects, then the locations of each of the antennas is required. The accuracy of the known position of the antennas will be a factor in determining the accuracy of the moving object; more accurate determination of the antenna locations allows a more accurate location of the moving object, as described below.

The transmitter or transmitters may be arranged to transmit any suitable waveform. The transmitted waveform is one allowing the impulse response, or the complex power-delay profile, associated with a particular transmitter-receiver pair to be measured. The bandwidth of the transmitted signal may be selected according to the spatial accuracy required. A signal of wider bandwidth will generally result in greater spatial resolution, and so is preferred where greater accuracy is required.

In systems having a plurality of transmitters, the individual transmitters may be arranged to simultaneously transmit individual orthogonally coded signals. The coding may be anything suitable, such as Costas codes or Walsh codes. More details of suitable codes may be found in "Spreading codes for direct sequence CDMA and wideband CDMA cellular networks", Dinan, E. H. Jabbari, B., IEEE Communications Magazine, 36(9): 48-54, September 1998. This coding allows the signals relating to each transmitter-receiver pair to be separated, using known correlation techniques within the receivers, which have knowledge of the codes being transmitted. The decoding of orthogonal signals is known, and more information may be obtained from, for example, "Radar Signals" by Nadav Levanon and Eli Mozeson.

Alternatively, for systems having multiplexed antennas at each transmitter or receiver, a time multiplexed signal may be sent, with a defined time slot allocated to each transmit-receive antenna pair. It will be understood by those normally skilled in the art that it is preferable to operate a time-multiplexed system by multiplexing the transmit antennas only, and processing signals received at the receive antennas simultaneously. This is because of the impact on achievable PRF that would otherwise occur in a fully multiplexed system. A frequency chirp signal is advantageously used with multiplexed antenna systems, as it may conveniently be processed using pulse compression techniques in a known manner to obtain a defined spatial resolution.

Preferably, if a time multiplexed approach is used, the time taken to complete a cycle of transmissions from each transmitter is kept short, such that any change in the multipath conditions during that time is minimal. When using this method the number of transmit antennas and the desired system spatial resolution are important considerations. The higher the number of transmit antennas used, the more time slots are required for transmission, with each time slot needing to be long enough to transmit, and receive through the multipath environment, the transmitted signal.

If simultaneous transmission (using coded signals for example) as described above is employed, then a set of received signals can be produced in a single transmission from all antennas. A set of N×M power delay profiles can then be produced from this single transmission. A plurality of transmissions will clearly be needed if a time-multiplexed approach is used to generate the full N×M set, whereas a set of N×M profiles can be generated in a single transmission if it is suitably coded.

The method includes the step of storing impulse responses, or power-delay profiles, from each transmitter-receiver pair. These power-delay profiles represent the signal flight times of signals at each receiver antenna transmitted by a given transmitter antenna, and so give a profile of the region, or channel, traversed by the transmitted signal or signals.

The power delay profiles will consist largely of clutter responses, i.e. of responses from stationary objects such as trees. Mixed in with this clutter will be responses from target objects. The target objects must be separated from the clutter for the method to be effective.

To do this, a difference of two profiles corresponding to a given transmitter-receiver pair taken at different times is produced. This difference represents any changes in the channel over the time difference period. The difference may be compared to a pre-determined threshold to determine whether the difference is significant, and therefore representative of a target. The difference signal may advantageously be processed using standard radar processing techniques, e.g. with a Constant False Alarm Rate (CFAR) algorithm.

The time difference between the first and second power delay profile responses may be between 0.1 s and 10 s, such as between 0.2 s and 5 s, such as between 0.5 s and 1 s, or between any combination thereof. Time differences outside this range may be used to detect particularly fast or slowly moving objects.

The power delay profile is preferably a complex power delay profile. A complex power delay profile stores both amplitudes and phases of received signals, the use of which during subsequent processing greatly improves the system's ability to detect moving objects. The difference between two complex power delay profiles will be a coherent difference.

It will be understood by a person normally skilled in the art that the impulse response coherent difference represents a relative time or times of arrival of a signal passing between the given transmitter-receiver pair. In a noiseless ideal environment this difference will be a reflection from something or things that have changed in the region of interest in the time difference between the signals being taken, and therefore is likely to represent a moving target or targets within the environment. With knowledge of the relative locations of the transmitter and receiver antennas, the time of arrival may usefully be graphically represented on a plan of the region. This plot will, for a single transmit-receive antenna pair and a single moving object tend to be elliptical in nature, as it represents the locus of a constant distance between the transmitter, the moving object, and receiver antennae locations. Again in an ideal noiseless environment the moving target will be located somewhere on this ellipse.

The graphical plot may be generated on a pixel-by-pixel basis. Each pixel may represent a location in the region of interest. With knowledge of the locations of the transmitter(s) and receiver(s) in the region of interest then each pixel relative to a given transmitter-receiver pair will represent a physical distance d from the transmitter to the receiver, via the location represented by the pixel. The value of each pixel may be determined by accumulating appropriate magnitude values from each impulse response coherent difference. The appropriate values will be those in the impulse response coherent differences at time t, where t=d/c, with t being the signal flight time, d the distance as mentioned above in this paragraph, and c the speed of propagation.

The graphical plot may alternatively be generated analytically, by formulating appropriate ellipses having the transmitter and receiver locations at the foci, and the circumferences being loci of constant distance d, where d is as described in the preceding paragraph.

There will generally be a set of concentric ellipses in the above ideal situation, due to multipath signals that reflect via the moving object and also from clutter objects such as trees. However, as these will have a larger time delay than the signal reflecting only from the moving target, these extra ellipses will all be larger in size than one just from the target, and so may be discriminated on these grounds.

In environments where the position of objects such as buildings is known and can be retrieved from a geographic information system, it is possible to take into account multipath via these objects when calculating the likely position of targets. In this case the loci of potential target positions as determined by a single transmit-receive antenna pair is given by a set of elliptical arcs connecting the objects causing multipath. Although this introduces an added complication, the incoherent back propagation step described in the following paragraph is still able to perform target localisation.

When used with a plurality of transmit and/or receive antennas the method is able to perform a localisation step, i.e. to compute a likely location of the moving object. The impulse response differences, or power-delay profile differences (the two terms are synonymous as used herein) from a plurality of transmitter or receiver pairs may be mapped to a common positional reference, plotted together and incoherently summed, so building up a series of partially overlapping plots. The highest peak in the summation is the assumed position of the moving target. This process has been called an incoherent back-propagation method. The assumed position may be tracked over time to improve target detection with a reduced false alarm rate.

The invention also has utility in the detection and localisation of multiple targets. Each target present will result in the generation of a set of elliptical plots. There is the possibility in this instance that cross-ambiguities will be created due to spurious crossing of the multiple ellipses. Such cross-ambiguities may be resolved using known techniques, such as iterative maximum likelihood techniques.

According to a second aspect of the present invention there is provided a radar system for use in a region, the region being a multipath rich environment, the system comprising at least three transducers positioned in known locations, each transducer comprising a transmit antenna or a receive antenna, and there being at least one transmit and at least one receive antenna, and a processor, wherein at least one transmit antenna is adapted to transmit a plurality of signals at different times, the at least one receive antenna is adapted to receive the signals, and the processor is adapted to process the received signals, characterised in that the system is arranged to produce a first set of power delay profiles associated with a first time, and each associated with a particular transmit-receive antenna pair, and to produce a second set of power delay profiles associated with a second time, and each associated with a particular transmit-receive antenna pair, and wherein the processor is adapted to calculate a difference, for each transmit-receive antenna pair, between the first and second power delay profiles, the difference representing movement of one or more objects within the region between the first and second time, to produce, for N transmitters and M receivers, an N×M set of power delay profile differences, the processor being further adapted to use the N×M differences, along with the transducer location information, to localise the moving objects.

The antennas used may be whip antennas, or alternatively may be any antenna having a directionality allowing reception and transmission of signals throughout the region of interest. The antennas may be each made up of a plurality of individual antenna elements, with each element being arranged in a phased, or time-delayed configuration to implement directional (and steerable should the phase or time delays be variable) antennas. This provides additional localisation capabilities, albeit at additional cost and complexity.

The invention has particular utility when used at transmission frequencies of between 0.2 GHz to around 10 GHz. The normally skilled person will however appreciate that the invention will work beyond these values, but a lower performance may result due to, at the lower frequency end, a reduced reflection from e.g. human targets. At the higher frequency end the poorer propagation through such environments will tend to reduce performance.

According to a third aspect of the present invention there is provided a method of detecting a moving object or objects in a region of interest, the region including a multipath rich environment, comprising the steps of:

i. arranging at least three transducers about the region in known locations, each transducer being a transmit antenna or a receive antenna, and there being at least one transmit and at least one receive antenna;

ii. transmitting a first set of signals from at least one transmit antenna to at least one receive antenna, the first set of signals being, at the at least one receive antenna, a composite made up of signals received from multiple propagation paths;

iii. processing the first set of received signals to produce a first power delay profile response (alternatively known as an impulse response) representative of the relative time or times of arrival of the transmitted signal(s) at the receive antenna(s), at a first time;

iv. repeating steps ii. and iii. with a second set of signals to produce a second power delay profile response representative of the relative time or times of arrival of the transmitted signals at the receiver antenna(s), at a second time;

v. calculating, for each transmit and receive antenna pairing, a difference between the first response and the second response, the difference containing values representative of signal strength received for different signal propagation times, and including information relating to object movement between the first and the second time;

vi. repeating steps ii to v as necessary to produce, for N transmit antennas and M receive antennas, an N×M set of responses each comprising a power delay profile difference representative of the relative time or times of arrival of the transmitted signals at the receiver(s), for each set of signals transmitted by the transmitter(s).

vii. using the transmitter and receiver location information, and the timing information in the set of power delay profile difference to localise the moving object.

The invention will now be described in more detail, by way of example only, with reference to the following Figures, of which:

FIG. 1 diagrammatically illustrates a first embodiment of the present invention, indicating a typical arrangement of transmitters and receivers in a highly multipath environment;

FIG. 2 diagrammatically illustrates a representation of a highly scattering environment used to model the invention;

FIG. 3 shows a graph of an impulse response calculated from a signal received at a single receiver and transmitted by a single transmitter, as modelled in the model described in relation to FIG. 2;

FIG. 4 diagrammatically illustrates a representation of a highly scattering environment used to model the invention, but with the addition of an extra scatterer representative of a moving target;

Figure 7:
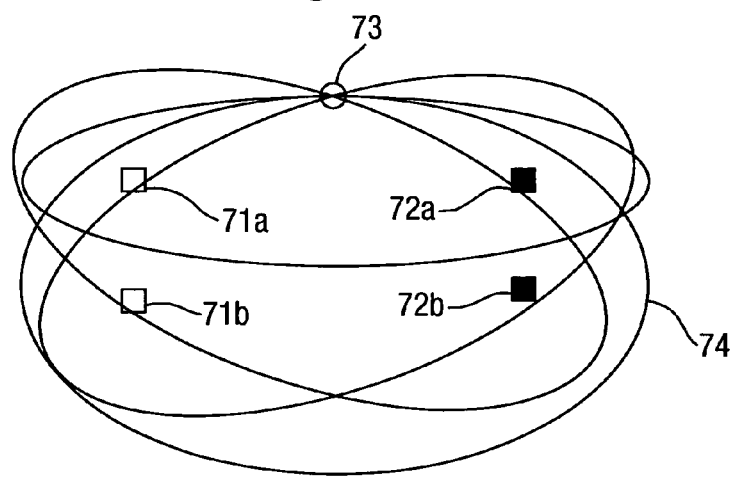
Figure 8:
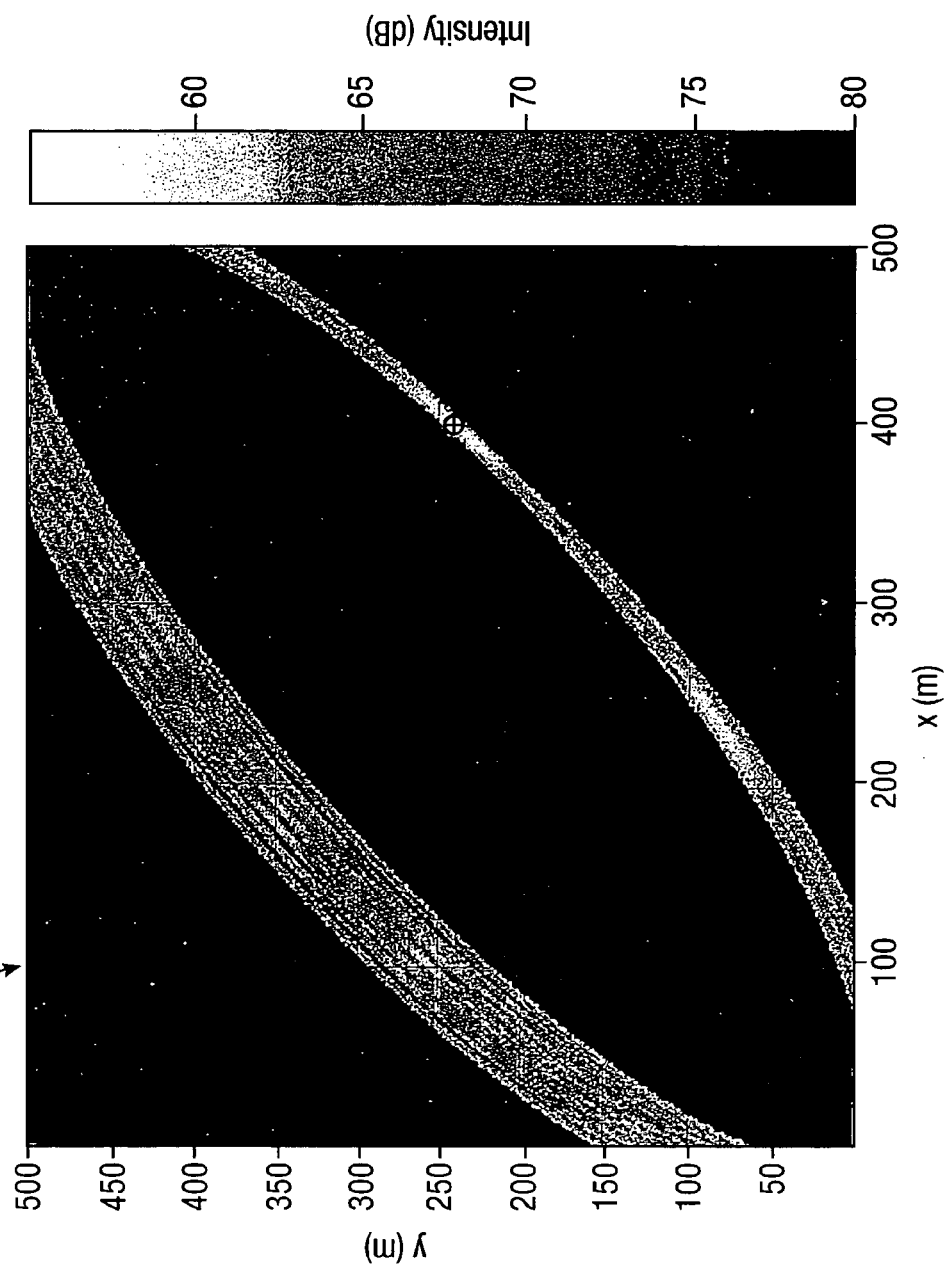
Figure 9:
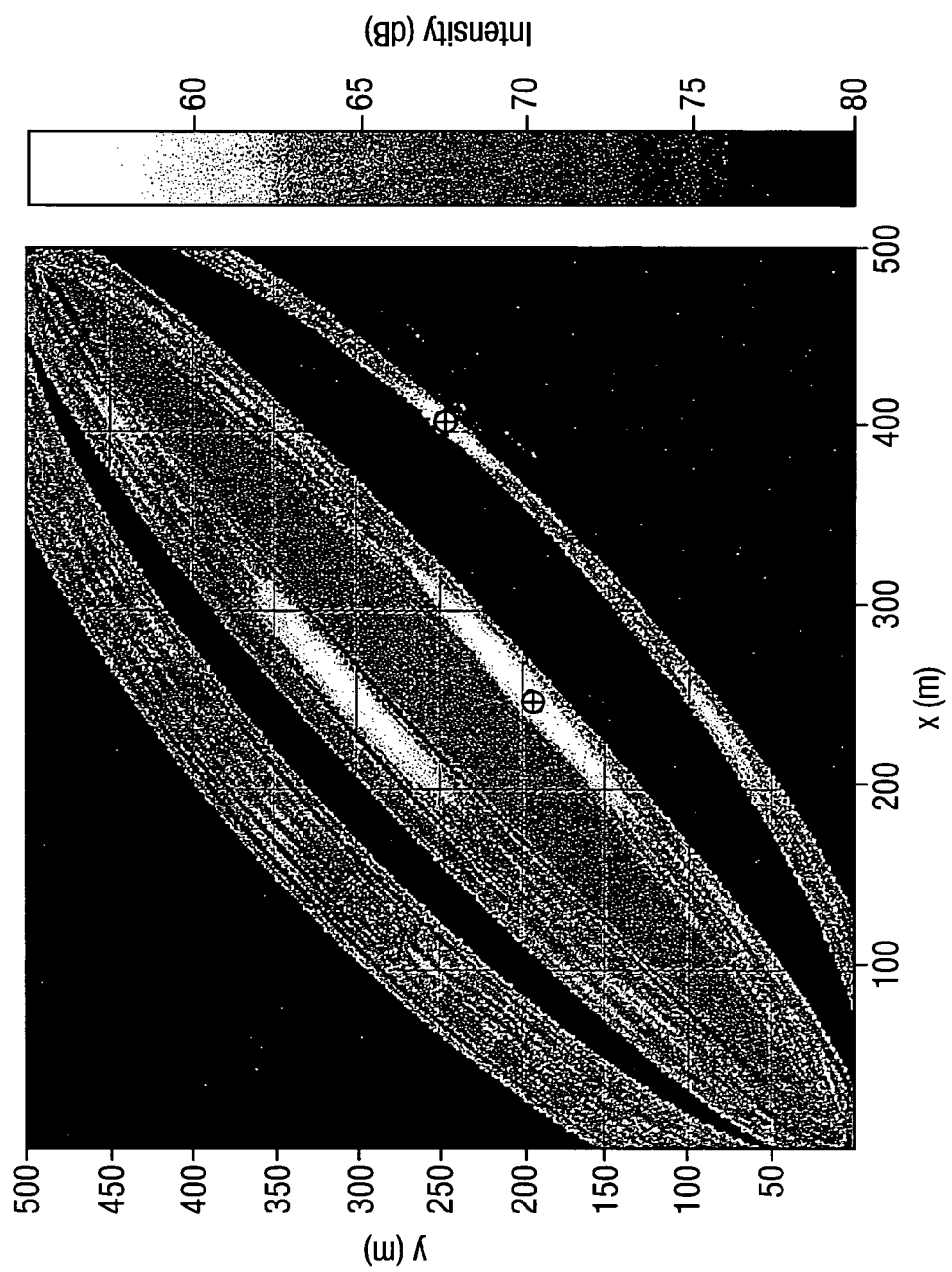
Figure 10:
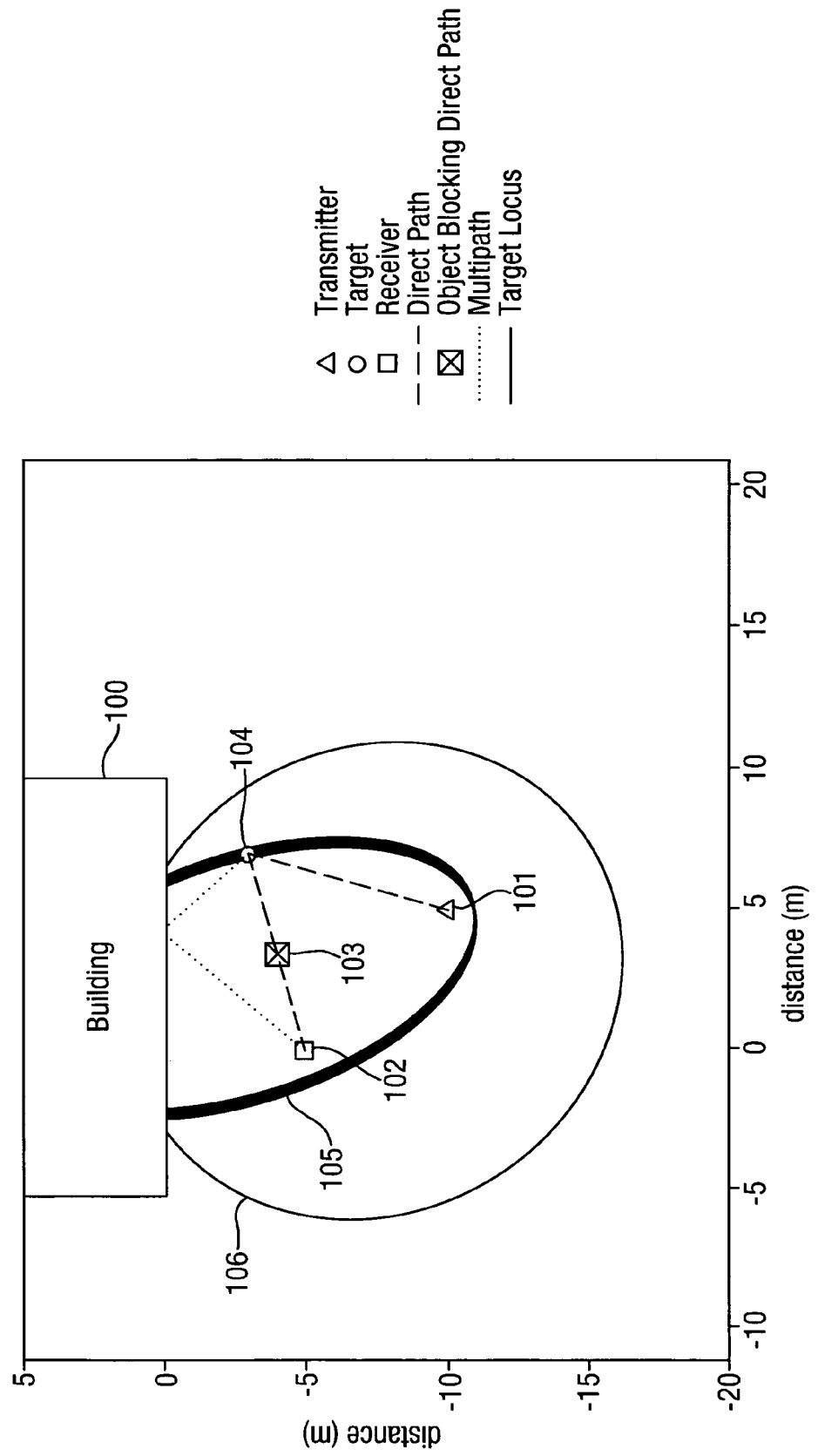

FIG. 7 diagrammatically illustrates the use of multiple transmitters and receivers to generate multiple ellipses to aid localisation of a target scatterer;

FIG. 8 shows a graph of the results of the incoherent back propagation technique on a model comprising a single target scatterer in a region with four transmitters and four receivers present;

FIG. 9 shows a graph of the results of the incoherent back propagation technique on a model comprising two target scatterers in a region with four transmitters and four receivers present;

FIG. 10 shows a graph of the results of the incoherent back propagation technique for a single transmit-receive antenna pair and a target, with multipath via a nearby building having been taken into account; and FIG. 11 diagrammatically illustrates the possibility of detecting, via multipath, targets that are obscured by buildings.

Figure 1:
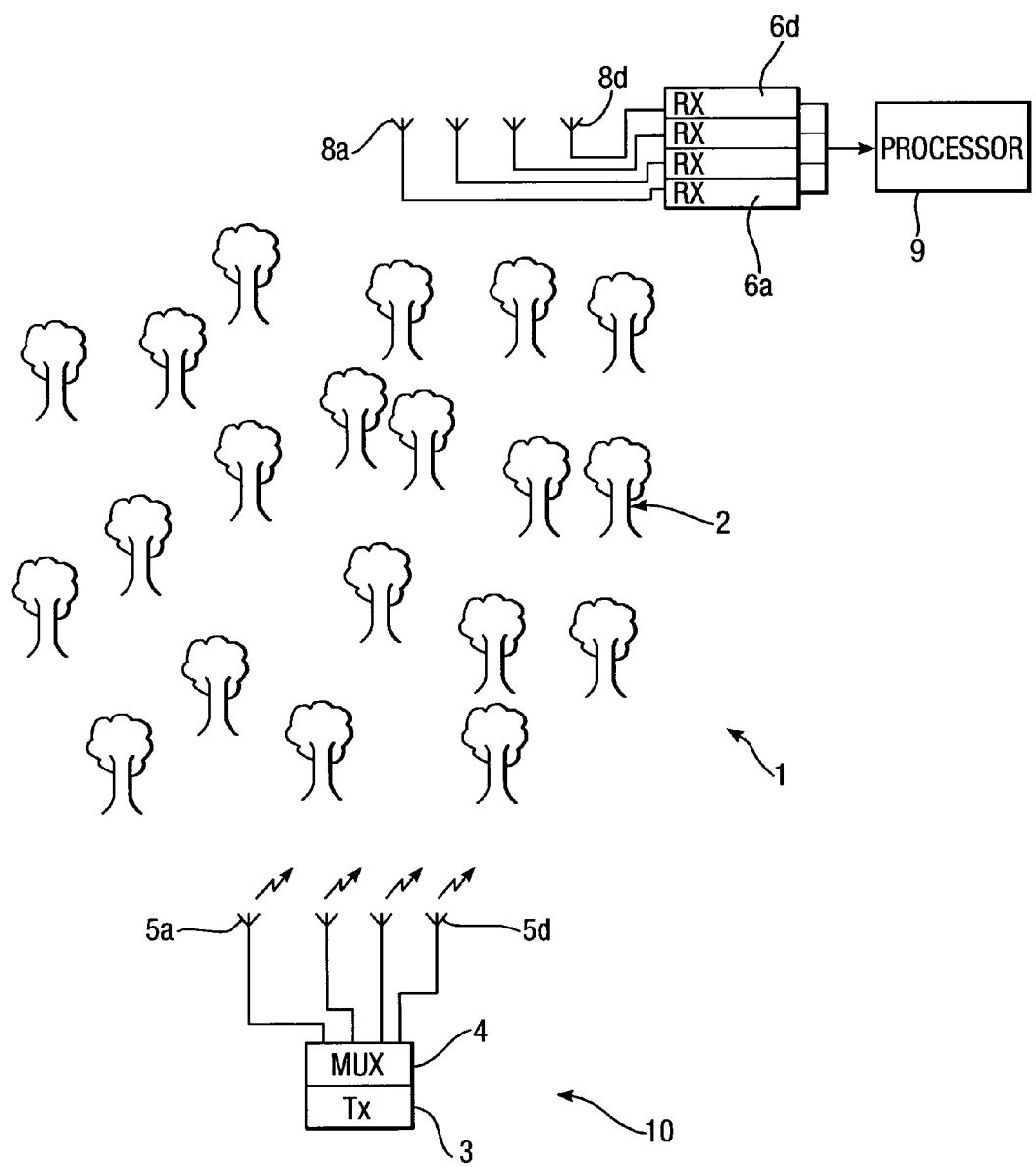

FIG. 1 shows a simplified representation of a situation where the present invention has utility. A woodland area 1 contains many trees, e.g. 2, each of which will tend to act as a reflector of RF radiation. A bistatic radar 10 comprises transmitter 3, transmit multiplexer 4 and transmit antennas 5a-d located at a first on the periphery of woodland 1. Receivers 6a-d and receive antennas 8a-d are located at a second point broadly on an opposite side of the woodland area 1. A processor 9 is connected to the receivers 6a-d, and is adapted to process the signals received to generate a channel estimate, and to process this estimate as described below.

In practice, the more widely separated the transmit and receive antennas are within the bounds of the region of interest, the better accuracy will generally result in determining the location of a moving target.

The bistatic radar's 10 transmissions are as follows. Transmitter 5 is programmed to transmit signals over a series of predetermined time slots. Each time slot is associated with a given transmitter antenna. Thus the first time slot is associated with antenna 5a, the second with antenna 5b, through to the time slot associated with antenna 5d. Following each transmission in a given time slot, multiplexer 4 switches the transmission to the next antenna. Each transmission is received by all antennas 8a-8d, receivers 6a-6d, and the received information processed in processor 9. This generates a 4×4 array of impulse responses, one for each transmitter-receiver pair.

This provides a complete channel estimate associated with the propagation of the transmitted signals. The signal transmitted is a linear frequency chirp starting at 1000 MHz and ending at 1100 MHz, which gives a resolution of approximately 1.5 m. The duration of the chirp is 1 µs and each slot is of 50 µs duration, giving an unambiguous bistatic range of 7.5 km. The normally skilled person would understand how these may be adapted to suit other desired ranges and resolutions.

This process is repeated at intervals of 0.5 s to produce a sequence of complete channel estimates, and the data from each repetition is processed in processor 9 as described below to carry out a target detection and localisation step. Processor 9 has knowledge of the locations of each of the transmit and receive antennas, information which is used in the localisation processing.

Figure 2:
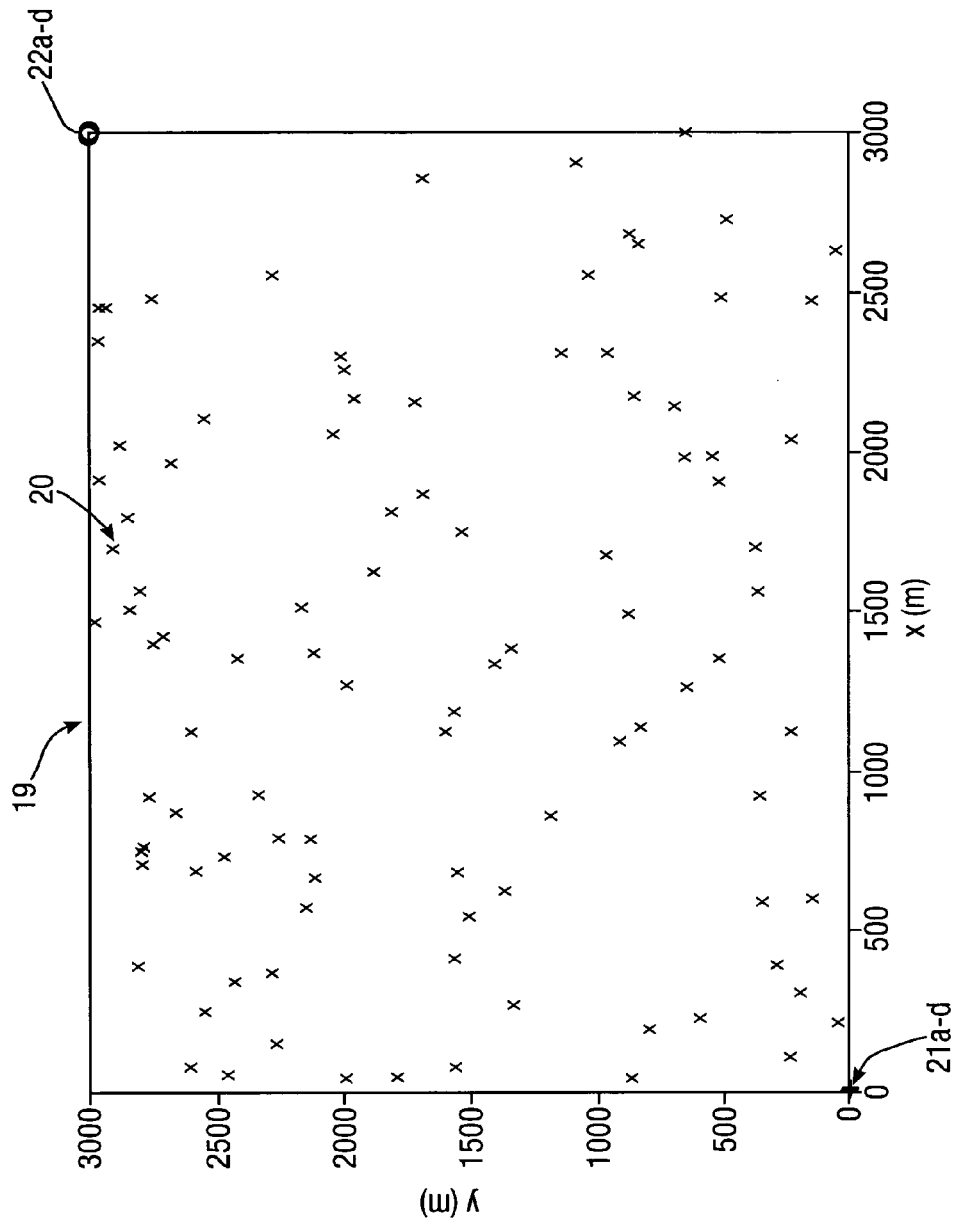

The invention has been modelled using the MATLAB program. FIG. 2 shows a representation of a 3 km square "forest" 19, containing 100 randomly distributed scatterers, each marked as an X e.g. 20, representing trees. Four transmitters 21a-d are located in the vicinity of 0 m, 0 m, as represented by crosses, and four receivers 22a-d are located in the vicinity of 3000 m, 3000 m, as represented by circles. Due to the scale of the image it is hard to discern the spacing between each of the transmitters, and each of the receivers, however, the modelled spacing is 10 m between adjacent antennas.

The model is based upon a chirped 1 GHz signal, with a chirp bandwidth of 100 MHz. This sets the temporal resolution of the received impulse responses at 10 ns, corresponding to a path length difference of 3 m. This was selected because it is a timing accuracy achievable in a typical GPS receiver.

Figure 3:
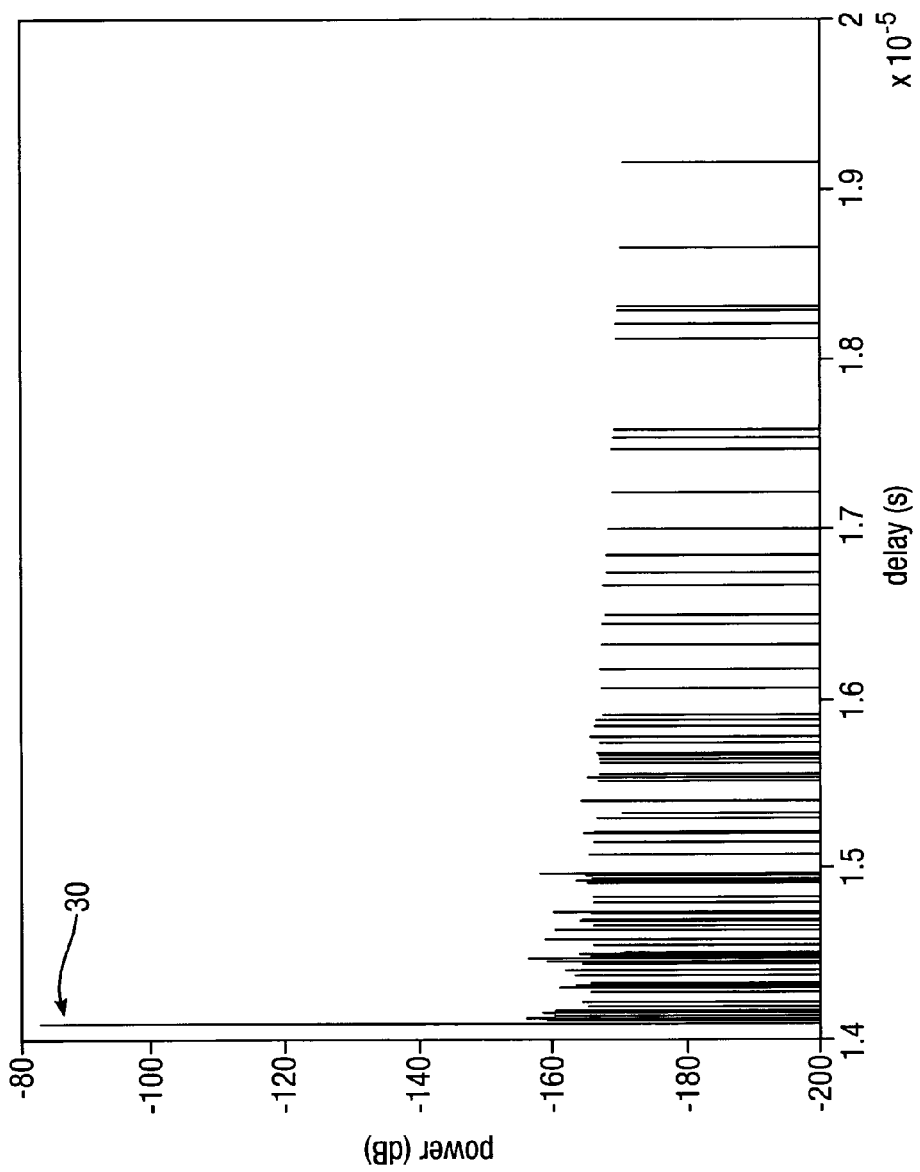

A ray tracing approach was used to compute the impulse response for each transmitter-receiver pair for the scenario represented in FIG. 2. A first response for the channel between transmit antenna 21a and receive antenna 22a of FIG. 2 is shown in FIG. 3. It can be seen that the earliest return 30, at around 14.1 μs delay is far larger than any of the others. This return corresponds to the direct path between the transmitter 21a and receiver 22a. In a real system this direct path is likely to be heavily attenuated. The remaining returns correspond to signal paths that have been reflected from one or more of the scatterers present. As these paths are longer than the direct path, the delay is always greater than the direct path.

For the modelled system with four transmit antennas a-d and four receive antennas a-d, a full estimate of the channel comprises a 4×4 matrix of the individual antenna pair responses as shown in FIG. 3.

The channel may be regarded as a multiple input, multiple output (MIMO) channel, due to the plurality of both transmit and receive antennas, with each antenna being separated from the others and hence providing independent fading statistics. MIMO technology is a relatively recent development in communications systems. MIMO systems take advantage of multipath conditions by exploiting the multiple independent communications paths that exist under such circumstances.

Figure 4:
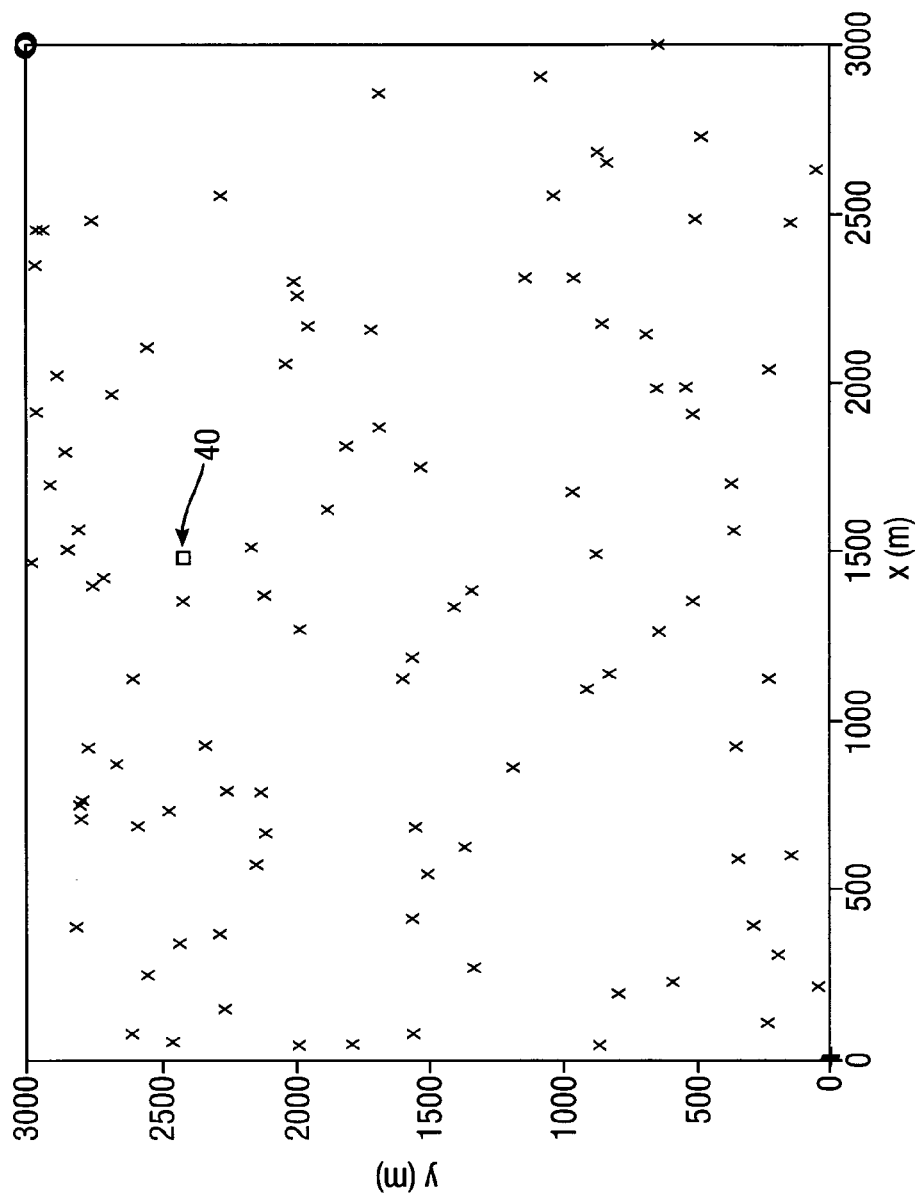

FIG. 4 shows the modelled representation of the "forest" as shown in FIG. 2, but with the addition of a "target" scatterer 4, indicated in the figure as a square. In reality, this may be a person or vehicle that has moved away from one of the existing scatters. The presence of this additional scatterer will change the impulse response of the channel. The model treats this target in the same way as the other scatterers in terms of its scattering properties.

Figure 5:
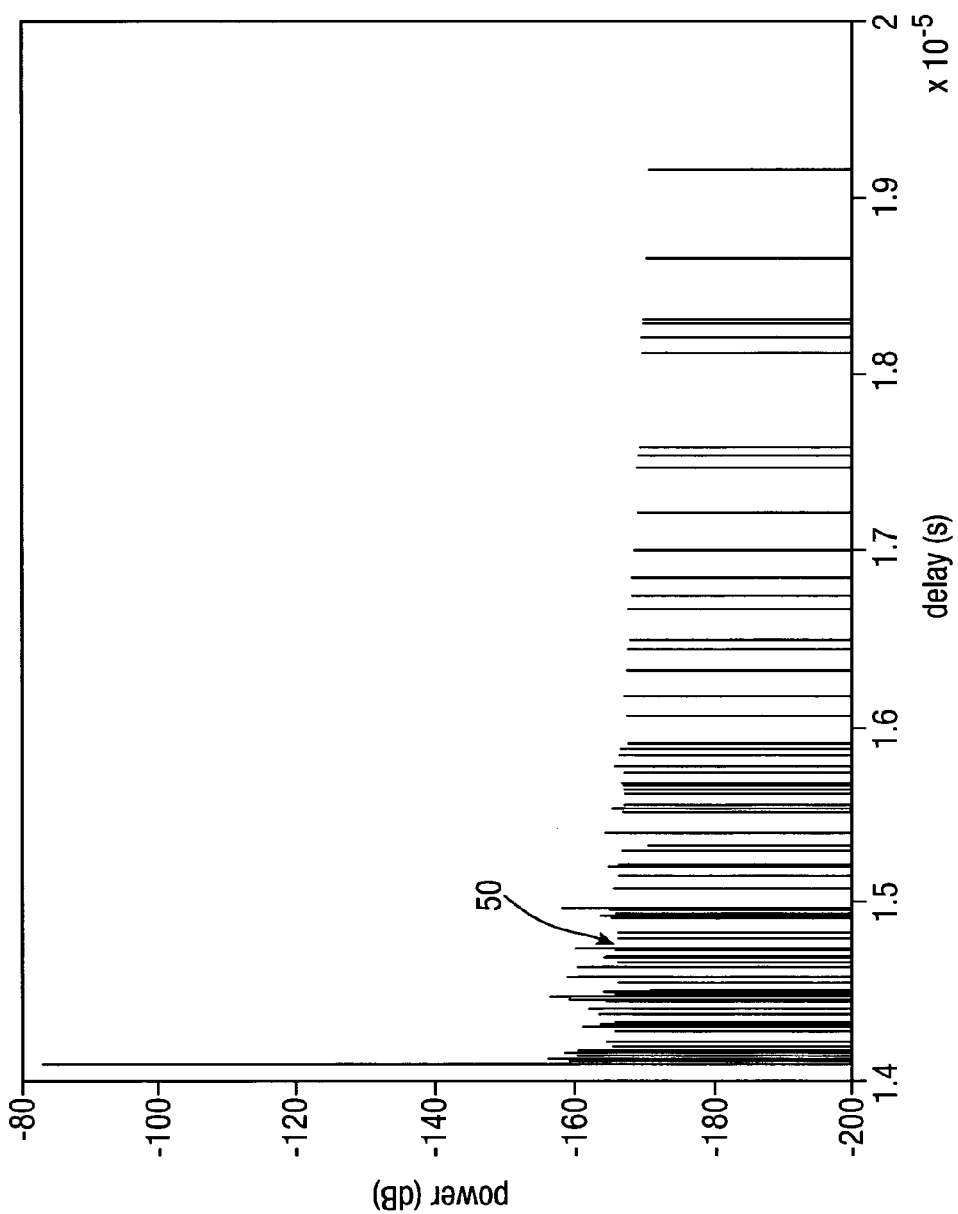
FIG. 5 shows a graph of an impulse response of the scenario as described in relation to FIG. 4, including the target scatterer.

FIG. 5 shows the revised, second impulse response from transmit antenna 21a to receive antenna 22a of the scenario including scatterer 40. Looking at the difference between the impulse responses of FIGS. 3 and 5, It can be seen that an additional impulse 50 is present at around 14.7 μs, corresponding to a signal reflecting from the target scatterer as it traverses the forest from transmitter 21a to receiver 22a. In a real system the delay profile will be affected beyond this first return due to multiple scatterings involving the target 50.

Here, the target return is embedded in the clutter caused by the returns from stationary trees. This clutter may be removed by coherently subtracting the first impulse response, as shown in FIG. 3, from the subsequent one (which in practice may be taken for example 0.5 seconds later), shown in FIG. 5. Of course, these impulse responses must share corresponding transmit and receive antennas. In carrying out the subtraction, the phase information within the impulse responses is used, and so the subtraction is a complex difference between the two. This process is called coherent change detection. This is done for the impulse responses corresponding to each transmit-receive antenna pair. The result is thus a complex delay profile for each transmit-receive antenna pair corresponding to scatterers (e.g. the target scatter 40) that have changed in the time between recording the first and second impulse responses. The output of the coherent change detection is compared against a pre-determined threshold level to reduce returns corresponding to very small objects or noise.

Figure 6:
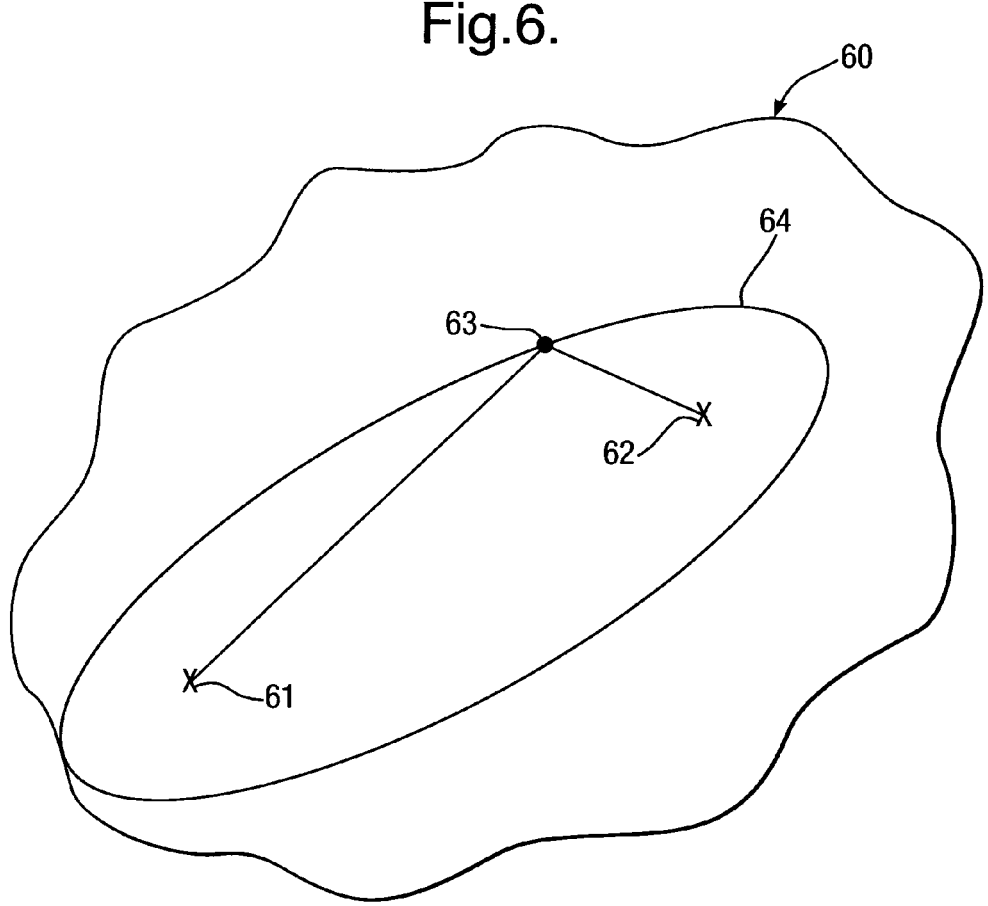
FIG. 6 illustrates how the incoherent back propagation method tends to produce an elliptic image, with the target scatterer being located somewhere on the ellipse boundary.

Of course, at this stage the system has little knowledge of where in the forest the target scatterer is located. However, the value of the delay corresponding to the target scatterer may now be used to hypothesise the location of the target scatter as lying on an ellipse having the positions of the appropriate transmit and receive antennas as the ellipse foci. This is shown in FIG. 6. A region 60 contains a single transmitter antenna 61 and a single receiver antenna 62. A single scatterer 63 is shown, with the EM transmission path from the transmitter 61 to the scatterer 63 and thence to the receiver 62 indicated. The propagation delay associated with this path is $t_d$ seconds. This propagation delay may be converted into a length l, where $l=t_d \cdot c$, where c is the speed of light, and the locus of the plot of the length l to the location of a single scatterer between the transmit 61 and receive 62 antennas generates the ellipse 64 mentioned above.

FIG. 7 shows the above process, this time where there are two transmitters 71a-b, and two receivers 72a-b present, along with a single scatterer 73. Each transmitter-receiver pair generates a single ellipse e.g. 74 according to the process described above. Each ellipse takes in the scatterer on its periphery. Thus where all of these individual ellipses cross is the position determined as most likely to be that of the scatterer responsible for the ellipses. Hence the use of multiple transmitters and/or receivers, which will generate a plurality of ellipses for each target scatterer, can be used to aid the localisation of the scatterer within the region of interest.

In practice the above FIGS. 6 and 7 are images built up from individual pixels, wherein each pixel maps to a physical location on the region of interest. Each pixel is therefore associated with a delay time $t_d$ equal to the propagation time between a given transmitter, the pixel's associated location in the region of interest, and a given receiver, as described above. For each transmitter and receiver pair, the contributions in the output of the coherent change detection step corresponding to the delay time $t_d$ are accumulated to arrive at an intensity value, and this value is assigned to the pixel in question. This process has been called Incoherent Back Propagation, and, for a single target and a single transmitter-receiver pair, results in an elliptical pattern as shown.

FIG. 8 shows an output of a modelled system comprising four transmit and four receive antennas. The region modelled here is a 500 m by 500 m square, with a single scatterer. The four transmit antennas are located in the region of 0 m, 0 m and the receiver antennas located in the region of 500 m, 500 m. The transmit antennas are linearly positioned with a separation of around six wavelengths between neighbours. The receive antennas are similarly positioned relative to each other.

The four transmit antennas and four receive antennas thus produce 16 coherent change detection outputs, one for each pair. The above process of plotting, for each pixel in the region, the accumulation of the part of the coherent change detection output corresponding to the appropriate delay, results in the partial ellipses as shown. Here, a brighter pixel is indicative of a higher value in the coherent change detection output.

It can be seen that the brightest point in the image is where the ellipses all apparently cross, at a point in the vicinity of x=400 m, y=250 m, which is the location of the scatterer.

In practice, noise spikes, antenna sidelobes, time sidelobes, and other multipath responses may all produce artefacts in the image. Such artefacts will frequently manifest themselves as concentric ellipses surrounding a response from a genuine target. Known averaging or tracking methods may be used reduce these effects. The impulse responses obtained using the invention may also be processed using known Doppler filtering techniques to reduce the effects of internal forest motion. For example, standard Moving Target Indication (MTI) and Moving Target Detection (MTD) techniques (Muehe, C. E., The moving target detector, IEEE Trans. Aerospace and Elect. Sys., Vol. 42, Issue 3, July 2006, pp 1177-1181) may be applied to the measured signals for each transmit-receive antenna pair before change detection processing. These techniques allow returns from the slowly-varying forest background to be removed. More sophisticated adaptive techniques could also be applied to filter out unwanted background clutter (Anderson, K. J.; Ward, J.; O'Donnell, R. M., Adaptive Doppler filtering applied to modern air traffic control radars, Proceedings of the IEEE Radar Conference, 26-29 Apr. 2004, pp: 242-248).

FIG. 9 shows an image produced by the incoherent back propagation process described above, but this time with two targets present. A first target is present in the same location as described in FIG. 8, at around x=400 m, y=250 m. The second target is located at x=250 m, y=200 m. It can be seen that each target generates a set of ellipses. Peak detection of the image is again used to locate the targets' locations within the image. With multiple targets present it is possible that cross-ambiguities may be created due to spurious crossing of the multiple ellipses. Such ambiguities may be resolved by using iterative maximum likelihood techniques to improve the localisation performance. A variety of techniques could be used in this situation but two suitable techniques would be modified versions of either IMP (J. Mather, "The incremental multi-parameter algorithm", 24th Asilomar conference on signals, systems and computers, 1:368-372, November 1990) or RELAX (J. Li and P. Stoica, "Efficient mixed-spectrum estimation with applications to target feature extraction", 29th Asilomar conference on Signals, Systems and Computers, 1:428-432, 1995.)

FIG. 10 shows how the presence of a building 100 affects the locus of the hypothesized target position for a single transmit 101 and receive 102 antenna pair. It is assumed that the position of the building 100 is accurately known from some other source, such as a geographic information system, and that some object 103 is blocking the direct path from a target 104 to the receive antenna 102.

From any given pixel, a signal propagation path travelling via the building may be hypothesised, and the additional distance traveled by the signal, manifesting as an additional time delay in the power delay profile, can be taken into account. This may be done in the incoherent back-propagation step by calculating the distance of all possible multipath routes the signal can take and accumulating in the appropriate pixel the signal power associated with the time-of-flight of each multipath distance from each transmit-receive antenna range profile.

For example, as shown in FIG. 10, an inner elliptic arc 105 is calculated from the delay of the signal received by the receiver via multipath from the building 100, and contains the correct position of the target 104. This delay could also have been caused by a target on the outer elliptic arc 106 whose reflected signal was not subject to multipath. Note that it is not possible from this information alone to determine on which arc the target is located. However, when the incoherent back propagation technique is applied, the elliptic arcs produced by each transmit-receive antenna pair will all overlap only at the correct target position. If the target-receiver path were not blocked as in this example, an additional ellipse, corresponding to the usual transmitter-target-receiver propagation time, that contains the target position would also be present. This signal would simply enter the incoherent back propagation calculation and contribute towards target detection and localisation. As with the transmit and receive antenna positions, the more accurately the position of the building is known, the more accurate the detected target location will be.

FIG. 11 shows how targets obscured by buildings may be detected if multipath propagation exists via another building. Transmitters and receivers 110 as described above are positioned about a region containing buildings 111, 112, and a target 113. The process as described in relation to FIG. 10 may be employed to provide a more accurate location of the target 113 than would otherwise be obtained. Knowledge of the buildings 111, 112 is assumed, e.g. from a geographical information system. In this example the system is effectively able to "see around the corner" of the obscuring building 112 using the multipath reflections from building 111. When using radio waves it is likely that some energy will be diffracted around the leading corner of the obscuring building 112 as shown in the figure. It is assumed that this signal is of a low enough power not to be of significant detriment to the performance of the system. However, if necessary such information could be added in to the calculation. Note that each transmitter is shown co-located with a receiver in this embodiment. The spatial separation between each transmitter/receiver pair however ensures that each receiver is likely to receive signal with independent fading characteristics, and so enable the incoherent backpropagation technique discussed above to localise the target 113.

An alternative method of processing the coherent change detection differences is possible. In this scheme a peak detection algorithm would detect the time delay of several peaks in the coherent difference signal for each transmit-receive antenna pair. Using this delay and the location of the transmitters and receivers an analytic equation describing the ellipses corresponding to each potential target position is calculated. In ideal circumstances the position at which all the ellipses overlap would indicate the true target position. However, in practice noise and other impairments results in ellipses that do not all precisely overlap at the same point. The points at which each pair of ellipses overlaps is calculated analytically and is recorded as a potential target detection along with the magnitude of the difference signals associated with this position. The potential target detections as a whole are automatically examined for tightly positioned clusters. Clustering may be performed with any standard algorithm, such as the k-means clustering algorithm (Andrew Webb, Statistical Pattern Recognition, John Wiley and Sons, 2003). Clusters whose sum-of-component-magnitudes are above a detection threshold are declared as a target. The weighted centroid of the cluster indicates the target position.

Although the invention has been described in relation to the transmission and reception of electromagnetic signals, it will be clear to the normally skilled person that the invention may also be used with other such signals. For example, the invention may be employed in a multi-static sonar system using sound waves as the transmission medium.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived there-from. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of detecting a moving object or objects in a region of interest, the region including a multipath rich environment, comprising the steps of:
   i. arranging at least three transducers about the region in known locations, each transducer being a transmit antenna or a receive antenna, and there being at least one transmit antenna and at least one receive antenna;
   ii. for a given transmit and receive antenna pair, transmitting a first signal from the at least one transmit antenna, and receiving it at the at least one receive antenna, the signal at the receive antenna being a composite signal made up of signals received from multiple propagation paths;
   iii. processing the first composite signal to produce a first power delay profile response (alternatively known as an impulse response) representative of the transit time or times of the transmitted signal at the receive antenna;
   iv. repeating steps ii and iii as necessary for each other transmit antenna and receive antenna pair to produce, for N transmit and M receive antennas, a first set of N×M responses each comprising a power delay profile response, and being representative of the region at a first time;
   v. repeating steps ii. to iv. to produce a second N×M set of power delay profile responses representative of the transit time or times of arrival of the transmitted signal(s) at the receive antenna(s) and being representative of the region at a second time;
   vi. calculating a difference between the first and second set of responses, the difference containing values representative of signal strength received for different signal propagation times, and including information relating to object movement between the first and second time;
   vii. using the transmitter and receiver antenna location information, and the timing information in the power delay profile difference to localise the moving object, the localisation being carried out with the aid of an image, each pixel of which corresponds to a part of the region of interest, and the image comprising information representative of the power delay profile difference, wherein the value of each pixel is based upon an accumulation of the values from each difference corresponding to the propagation delay of a signal passing between each transmit antenna to each receive antenna via that part of the region represented by the pixel.

2. A method as claimed in claim 1 wherein a plurality of transmit antennas are used, each separated from the others by a distance sufficient to ensure that each transmit-receive channel has independent fading characteristics.

3. A method as claimed in claim 1 wherein a plurality of receive antennas are used, each separated from the others by a distance sufficient to ensure that each transmit-receive channel has independent fading characteristics.

4. A method as claimed in claim 1 wherein the transmitter antennas and receiver antennas are not co-located, and form a bistatic or multi-static system.

5. A method as claimed in claim 1 wherein the transmitted signals are coded to enable each receiver to know from which transmitter a received signal emanated.

6. A method as claimed in claim 5 wherein the coding takes the form of time multiplexing the transmitted signals.

7. A method as claimed in claim 5 wherein the transmitted signal is a chirp.

8. A method as claimed in claim 5 wherein the coding takes the form of code division multiplexing of the transmitted signals.

9. A method as claimed in claim 5 wherein the coding takes the form of frequency division multiplexing of the transmitted signals.

10. A method as claimed in claim 1 wherein the differences between the first and second set of responses are processed using a constant false alarm rate algorithm.

11. A method as claimed in claim 1 wherein each of the delays corresponding to the differences is used to produce an ellipse having the locations of the appropriate transmitter and receiver antennas at the ellipse foci, the ellipse boundary corresponding to a possible location of a moving target.

12. A method as claimed in claim 11 wherein the intersections of ellipses are grouped into clusters with the clusters having the highest number of intersections indicating likely target positions.

13. A method as claimed in claim 1 wherein the difference between the first response and the second response is a coherent difference.

14. A method as claimed in claim 13 wherein the set of power delay profiles comprise complex power delay profiles.

15. A method as claimed in claim 1 wherein the value from each difference used to generate a pixel value is chosen taking into account likely multipath delays caused by objects in the region having a known position.

16. A method as claimed in claim 1 wherein the difference between the first response and the second response is an incoherent difference.

17. A radar system for use in a region, the region being a multipath rich environment, the system comprising at least three transducers positioned in known locations, each transducer comprising a transmit antenna or a receive antenna, and there being at least one transmit and at least one receive antenna, and a processor, wherein at least one transmit antenna is adapted to transmit a plurality of signals at different times, the at least one receive antenna is adapted to receive the signals, and the processor is adapted to process the received signals, characterised in that the system is arranged to produce a first set of power delay profiles associated with a first time, and each associated with a particular transmit-receive antenna pair, and to produce a second set of power delay profiles associated with a second time, and each associated with a particular transmit-receive antenna pair, and wherein the processor is adapted to calculate a coherent difference, for each transmit-receive antenna pair, between the first and second power delay profiles, the coherent difference representing movement of one or more objects within the region between the first and second time, to produce, for N transmitters and M receivers, an N×M set of power delay profile differences, the processor being further adapted to use the N×M differences, along with the transducer location information, to localise the moving objects, and the processor being further adapted to generate an image, each pixel of which corresponds to a part of the region of interest, with the value of each pixel being based upon an accumulation of the values from each coherent difference corresponding to the propagation delay of a signal passing between each transmit antenna to each receive antenna via that part of the region represented by the pixel.

18. A system as claimed in claim 17 wherein the power delay profiles are complex power delay profiles, and the difference between the two complex power delay profiles is a coherent difference.

19. A system as claimed in claim 17 wherein the system comprises a plurality of transmit antennas, and a plurality of receive antennas, each of the plurality of transmit antennas being connected to a transmitter and being arranged to transmit a uniquely coded signal.

20. A system as claimed in claim 17 wherein the accumulation of values of the coherent differences is an incoherent accumulation.

* * * * *